(12) United States Patent
Wang et al.

(10) Patent No.: US 8,635,469 B2
(45) Date of Patent: Jan. 21, 2014

(54) METHOD AND APPARATUS FOR I/O DEVICES ASSISTED PLATFORM POWER MANAGEMENT

(75) Inventors: Ren Wang, Portland, OR (US); Jong Han Park, Pasadena, CA (US); Christian Maciocco, Portland, OR (US); Jr-Shian Tsai, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 12/644,720

(22) Filed: Dec. 22, 2009

(65) Prior Publication Data
US 2011/0154080 A1   Jun. 23, 2011

(51) Int. Cl.
*G06F 1/32* (2006.01)
(52) U.S. Cl.
USPC ........... 713/300; 713/310; 713/320; 713/321; 713/322; 713/323; 713/324; 713/330; 713/340

(58) Field of Classification Search
USPC .............. 713/300, 31, 320–324, 330, 340
See application file for complete search history.

(56) References Cited

U.S. PATENT DOCUMENTS

| | | | | |
|---|---|---|---|---|
| 6,161,187 | A * | 12/2000 | Mason et al. | 713/322 |
| 7,917,787 | B2 * | 3/2011 | Jahagirdar et al. | 713/320 |
| 8,078,891 | B2 * | 12/2011 | Fletcher | 713/320 |
| 2008/0028240 | A1 * | 1/2008 | Arai et al. | 713/300 |
| 2009/0327553 | A1 * | 12/2009 | Fletcher | 710/262 |
| 2012/0084586 | A1 * | 4/2012 | Fletcher | 713/320 |
| 2012/0191995 | A1 * | 7/2012 | Naveh et al. | 713/320 |

* cited by examiner

*Primary Examiner* — M Elamin
(74) *Attorney, Agent, or Firm* — Kacvinsky Daisak PLLC

(57) ABSTRACT

Embodiments of an apparatus, system and method are described for input/output (I/O) device assisted platform power management. An apparatus may comprise, for example, power management logic operative to receive idle duration information from one or more input/output (I/O) devices and to modify a power state for one or more components based on the idle information. Other embodiments are described and claimed.

20 Claims, 4 Drawing Sheets

METHOD AND APPARATUS FOR I/O DEVICES ASSISTED PLATFORM POWER MANAGEMENT

BACKGROUND

The performance of modern computing systems has increased rapidly in recent years. One particular area in which performance has evolved is in the use of input/output (I/O) devices. Many modern computing systems include a plurality of I/O devices for performing a variety of functions. The increased functionality has also resulted in increased power consumption for computing systems that continue to decrease in size. As the number and type of I/O devices continues to increase, allowing for computing system platforms and other components to enter reduced power states becomes an important consideration. As a result, it is desirable to adapt reduced power states to converse computing system power. Consequently, there exists a substantial need for techniques for I/O device assisted platform power management for computing platforms.

DETAILED DESCRIPTION

Figure 1:
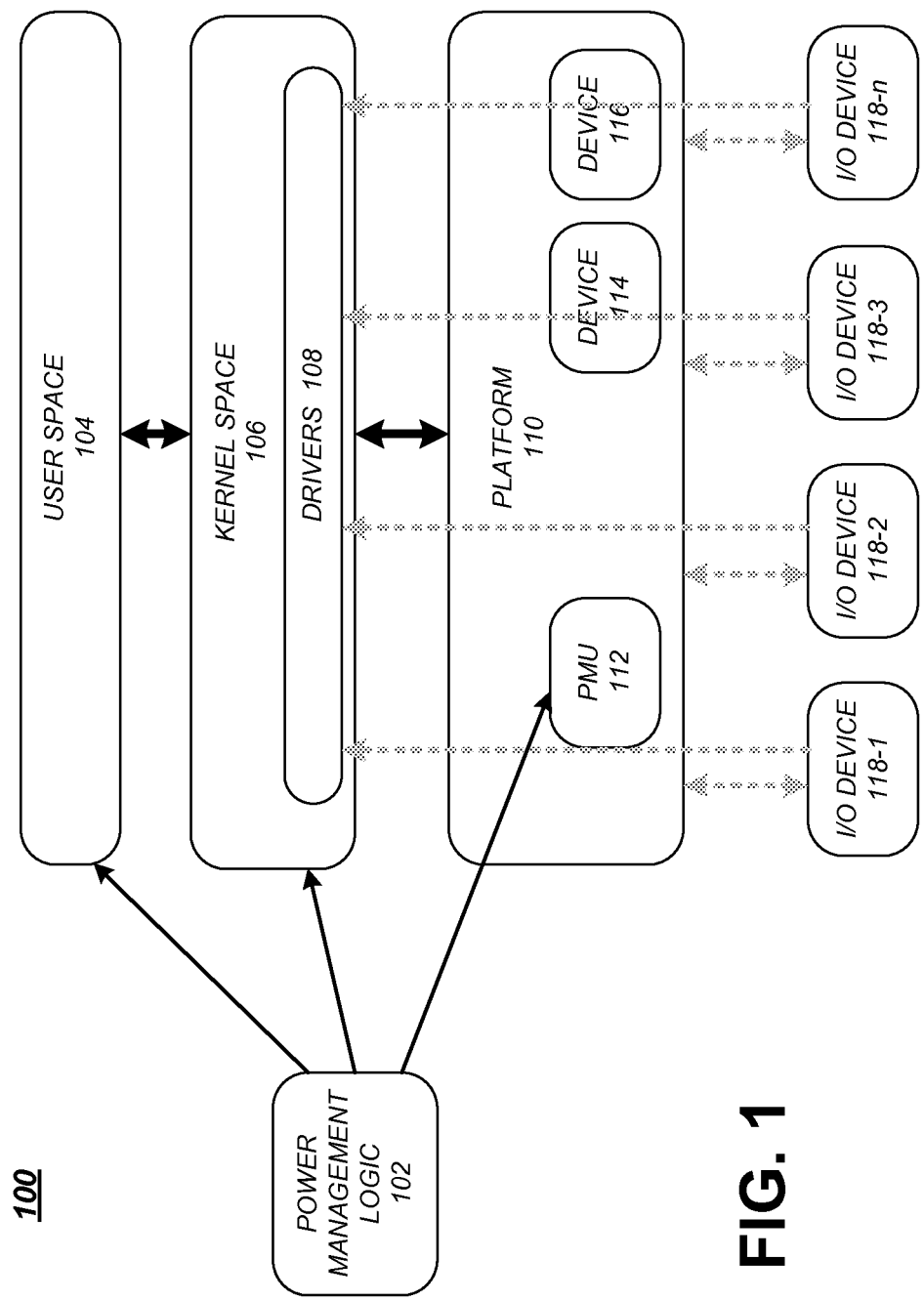
FIG. 1 illustrates one embodiment of an apparatus.

Embodiments are generally directed to techniques designed to reduce power consumption in computing systems. Various embodiments provide techniques that include power management logic operative to receive upcoming idle duration information from one or more input/output (I/O) devices and to modify a power state for one or more components or the full system based on the idle duration information. Other embodiments are described and claimed.

Modern computing systems, including mobile computing devices, e.g. laptops, tablets, cellular telephones, Smartphones and mobile internet devices (MIDs), offer ubiquitous functionality and connectivity through one or more I/O interfaces. The usage models of many of these devices are driven by I/O activities. While I/O devices themselves consume a relatively small portion of platform power for a mobile computing device, the impact of I/O usages on the overall platform power can be significant due to the non-deterministic nature of the I/O traffic and interrupts, which may keep the platform active in higher power consuming states more than necessary.

Processors and other platform components of typical mobile computing devices employ various mechanisms to reach low power states whenever possible. For example, many mobile computing devices enter low power states based on heuristics gathered based on previous CPU utilization, I/O usage and interrupts. This may be problematic, however, because different I/O devices generate non-deterministic interrupts, making it difficult for platform components to enter low power states and to remain in those states for relatively long periods of time. To alleviate these and other problems, it may be advantageous to regulate interrupts received from I/O devices and communicate this information to the platform's power management controller and components. This information could be used by the platform's power management controller and components to take advantage of I/O devices idle durations.

In some embodiments disclosed herein, apparatus, methods, interfaces and mechanisms are presented to enable receipt of I/O device interrupt and other idle duration information in order to create longer periods of idleness for the platform. For example, power management logic residing in the user space, the kernel space or integrated with platform firmware may be operative to receive idle duration information from one or more input/output (I/O) devices and to modify a power state for the full system or one or more components of a mobile computing device based on the idle duration information to enhance platform power management in various embodiments. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiment of an apparatus. FIG. 1 illustrates a block diagram of an apparatus 100. Apparatus 100 may comprise a computing system 100, such as a mobile computing device, in some embodiments. As shown in FIG. 1, computing system 100 comprises multiple elements, such as power management logic 102, user space 104, kernel space 106, drivers 108, platform 110, power management unit (PMU) 112, platform devices 114 and 116 and I/O devices 118-1-$n$ where n may comprise any positive integer. The embodiments, however, are not limited to the elements or the configuration shown in this figure.

As shown in FIG. 1, computing system 100 may include a user space 104 and a kernel space 106. User space 104 may comprise a portion of an operating system (OS) for system 100, a memory area for example, where all user mode applications for the system 100 to operate. Kernel space 106 may comprise a portion of an operating system for system 100 that is reserved for running the kernel, kernel extensions, and drivers 108 for computing system 100. Drivers 108 may comprise device drivers or software drivers in some embodiments. In various embodiments, drivers 108 comprise computer programs or code that allows higher-level computer programs to interact with a hardware device. One or more drivers 108 may communicate with a device through one or more buses or communications subsystems to which the hardware connects or couples. Other embodiments are described and claimed.

In various embodiments, system 100 includes a platform 110. Platform 110 may comprise a computing platform that may include or be coupled to devices 114 and 116. In some embodiments, device 114 may comprise a processor and device 116 may comprise platform control hub (PCH), for example. While a limited number of platform components (e.g. devices 114 and 116) are shown for purposes of illustration, it should be understood that platform 110 may contain any number or type of suitable devices and still fall within the described embodiments.

Platform 110 may also include a PMU 112 in some embodiments. In various embodiments, PMU 112 may be part of another platform component such as device 114 (e.g. a processor). In some embodiments, the PMU 112 may be implemented as a separate processing unit in a separate chip or in any suitable chip in the platform 110. In various embodiments, the PMU 112 may be implemented as a separate controller within the processor (e.g. device 114) or in another chip such as the PCH (e.g. device 116). In some embodiments, the devices 114 and 116 of platform 110 may be operative to execute an operating system (OS), along with a plurality of applications. Other embodiments are described and claimed.

In various embodiments, the PMU 112 may perform various different functions including managing the platform 110, as well as managing its activity or power state. In some embodiments, the platform 110 activity state may be independent from the activity state of, for example, the processor 114. For example, the processor 114 may be in a so-called "C" state (as defined by the Advanced Configuration Power Interface, ACPI, standard) whereby C0 is the most active state, while lower activity states (e.g., C1 to C7, depending on the CPU model) define different levels of reduced activity and thus reduced power consumption. At the same time, the platform 110 may be in its own power state, e.g., ranging from a higher activity state to lower level sleep states. In some embodiments, S0 may be the highest activity platform state, while S3, S4, and S5 indicate progressively lower activity platform states. In some embodiments, when the platform 110 is in an S0 state, network communications and other platform activity may occur, even when the processor is asleep, e.g., in a lower C state.

System 100 may also include I/O devices 118-1-n in some embodiments. In various embodiments, I/O devices 118-1-n may comprise peripheral devices associated with, coupled to and/or integrated into system 100. In some embodiments, I/O devices 118-1-n may comprise, for example, wired or wireless network devices, universal serial bus (USB) devices, audio devices, video devices, disk drive devices such as a hard disk drive for example, or any other suitable peripheral device. A limited number of I/O devices 118-1-n is shown for purposes of illustration and not limitation. It should be understood that any type and number of I/O devices could be implemented and still fall within the described embodiments.

In various embodiments, system 100 may include power management logic (PML) 102. In some embodiments, logic and/or modules described herein may comprise circuits or other logic. PML 102 may comprise any logic or module having software, hardware or a combination of hardware and software operative to receive idle duration information from one or more input/output (I/O) devices 118-1-n and to modify a power state for one or more components based on the idle duration information. In various embodiments, the one or more components may comprise platform 110 and/or any platform components such as devices 114 (processor) and 116 (PCH), for example.

As shown in FIG. 1, PML 102 may be operative in or may be located in different places throughout computing system 100 in different embodiments. For example, in some embodiments, PML 102 may reside in user space 104 or kernel space 108. In other embodiments, PML 102 may reside in platform 100 firmware or, for example, as part of PMU 112 or a processor like device 114.

PML 102 may be operative to receive the idle duration information from one or more device drivers 108 of the one or more I/O devices 118-1-n in some embodiments. For example, if the PML 102 is operative in or resides in the user space 104 or the kernel space 106, I/O devices 118-1-n may be operative to communicate their idle duration information directed to PML 102 using their corresponding device drivers 108. If, on the other hand, PML 102 is operative in or resides in platform 110 firmware, for example, idle duration information may be communicated to PML 102 using a special or dedicated hardware/firmware channel if hardware changes for system 100 are available. Other embodiments are described and claimed.

In various embodiments, PML 102 may be operative to assist platform 110 or any platform components in making power management decisions, such as entering reduced power states, for example. In some embodiments, PML 102 may issue commands to platform 110 or any platform components to enter a certain power state when current processing is completed and sufficient idle duration periods exist. PML 102 may be operative to assist in making power management decisions even in situations where not all I/O devices are equipped with functionality allowing them to report idle duration information to the PML (e.g. legacy I/O devices). PML 102 may be operative to assist in making the power management decisions based on the idle duration information received from one or more of I/O devices 118-1-n. In some embodiments, the idle duration information may comprise one or more of idle duration information, system timer information, and idle duration history information for one or more of the I/O devices 118-1-n. For example, the idle duration information may comprise an idle duration during which no interrupts will be received from one or more I/O devices 118-1-n and the platform or one or more platform components may be placed in a reduced power state or sleep state without being interrupted.

In various embodiments, one or more I/O devices 118-1-n may include logic operative to determine idle duration information for the I/O device and communicate this idle duration information to PML 102. In some embodiments, I/O devices 118-1-n may be configured to adaptively change its snoozing interval based upon an examination of I/O traffic, thereby reducing power consumption for system 100 while preserving QOS. The changes may be based, for example, on a classes of messages waiting in a queue for the I/O device, the number of messages, the number of packets in a period of time, the interpacket arrival time, or other measures of I/O traffic. The snoozing interval of an I/O device corresponds to the idle duration information reported from this device.

In some embodiments, I/O devices 118-1-n may include a timeout period determiner module that may determine the length of a timeout period for the I/O device. A timeout period may comprise a period of inactivity after which a snoozing interval may be redetermined. Timeout period determiner module may base the timeout period upon the information about I/O traffic for the I/O device contained in a queue.

I/O devices 118-1-n may include Smart-FIFO technology in some embodiments. In various embodiments, the Smart-FIFO technology, module or logic may be operative to perform direct memory access (DMA) coalescing intelligently to maximize a platform idle durations. This technology may be implemented at or by one or more of I/O devices 118-1-n.

In various embodiments, incoming I/O packets may be stored in I/O device FIFO buffer for a certain coalescing duration, and then DMA may be performed for all I/O packets coalesced in the FIFO buffer. This may be in contrast to the current implementations which perform DMA for I/O packet as soon as the packet reaches the top of FIFO buffer. In various embodiments, the benefit of using the above described FIFO buffering technique may be improved consecutive platform idle duration times (proportional to the coalescing duration) between platform activeness to let the platform or system 100 enter lower power states.

The Smart-FIFO policy and logic may be operative to allow the platform 110 and/or system 100 to stay at the lowest power idle state long enough to gain power benefit or power savings. To enter lower power idle states, in various embodiments, the platform 110 needs longer entry and exit latency. The different power state transitions may also generate power spikes. Thus, there exists some "break-even" idle duration time for each idle state. In other words, to gain power benefit for entering the lowest power idle state, the platform 110 needs to stay idle for longer than its break-even time, which may be platform-specific. Furthermore, under a typical OS policy, the platform 110 may enter the lowest power idle state only when the CPU utilization is less than or equal to certain threshold.

Further details regarding enabling the I/O devices 118-1-*n* to determine and communicate their idle duration information to PML 102 may be considered outside the scope of this disclosure. As such, further discussion of the mechanisms and procedures executed by and/or at the I/O devices 118-1-*n* has been excluded for purposes of clarity.

PML 102 may be operative to analyze, interpret or otherwise use the idle duration information received from one or more of I/O devices 118-1-*n* to modify a power state for one or more components of system 100. For example, in some embodiments, modifying the power state may comprise selecting a reduced power state for one or more platform 110 components, selecting a reduced power state for one or more processors or one or more processor cores of platform 110 or selecting a reduced power state for platform 110. Selecting a reduced power state may comprise, for example, transitioning from a higher power state to a lower power state to conserve system 100 power and/or entering into deeper sleep states than would otherwise be possible without knowledge of the idle duration information from the one or more I/O devices 118-1-*n*. Other embodiments are described and claimed.

Figure 2:
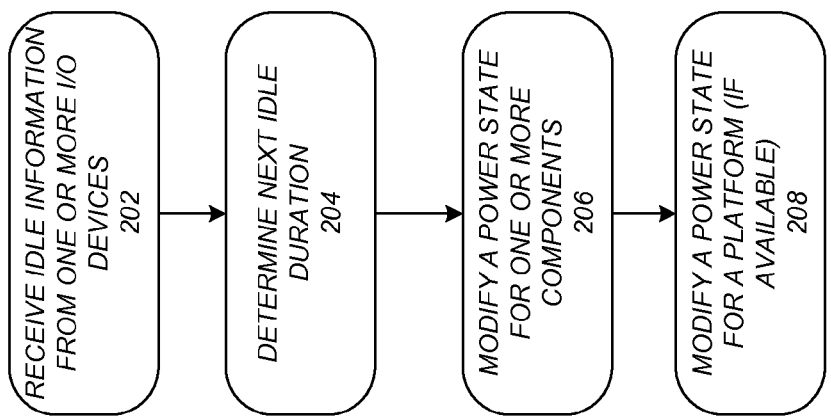
FIG. 2 illustrates one embodiment of a first logic diagram.

FIG. 2 illustrates one embodiment of a first logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe I/O device assisted platform power management as described above with reference to apparatus 100 and PML 102, for example.

In various embodiments, idle duration information may be received from one or more I/O devices at 202. For example, PML 102 of FIG. 1 may be operative to receive idle duration information from one or more of I/O devices 118-1-*n*. At 204, in some embodiments, a next idle duration may be determined. For example, PML 102 may be operative to or may include or comprise an algorithm operative to determine a next idle duration for one or more of I/O devices 118-1-*n*. The next idle duration may comprise a time during which no or few interrupts will be received from one or more I/O devices 118-1-*n*, allowing the platform or platform components to enter reduced power states or deeper sleep states, for example. In various embodiments, the next idle duration may be computed based on a combination of reported idle durations for one or more I/O devices, system and/or device timers and/or idle duration history information. For example, PML 102 may consider idleness information for multiple devices, system activity, such as a next timer interrupt, and past idle durations in some embodiments.

At 206, a power state for one or more components may be modified. For example, PML 102 may determine, based on the received idle duration information, that it would be advantageous to reduce the power state for or to enter a deeper sleep state for any platform 110 components. At 208, a power state for a platform may also be modified if available. For example, PML 102 may modify or reduce a power state for platform 110 in various embodiments. In some embodiments, PML 102 may control the power state modification or the PML 102 may be operative to output a signal or otherwise notify another platform component, such as PMU 112 for example that will handle the power state transition. Other embodiments are described and claimed.

In various embodiments, one or more of idle duration information, system timer information and idle duration history information may be received from one or more device drivers of the one or more I/O devices or from platform firmware. For example, as recited above with reference to apparatus 100 of FIG. 1, PML 102 may reside in user space 104, kernel 106 or platform 110 firmware. The idle duration information may be received from one or more device drivers 102 of the one or more I/O devices 118-1-*n* when the PML 102 resides in the user space 104 or the kernel space 106 or from platform 110 firmware if the PML 102 resides in the platform 110. Other embodiments are described and claimed.

In some embodiments, a lowest available power state may be selected. For example, PML 102 may select a lowest or deepest available C-state for a processor of platform 102 based on the idle duration information. The lowest available power state may be determined, for example, based on the length of the idle duration during which the processor will not be interrupted. A cache memory may be flushed, in various embodiments, before or after a lowest available sleep state is selected. For example, a cache memory of system 100 may be flushed or otherwise emptied when a lowest available power state for a platform 110 component is selected by PML 102.

An interrupt rate may be estimated for one or more I/O devices in some embodiments. For example, PML 102 may calculate an estimated interrupt rate for one or more of I/O devices 118-1-*n*. Based on the estimated interrupt rate, a reduced power state may be selected or, if the estimated interrupt rate exceeds a predetermined threshold, a default power state may be selected. For example, PML 102 may select a power state based on a comparison of the estimated interrupt rate to a threshold interrupt rate. If the estimated rate exceeds the threshold rate, for example, a default power state may be selected wherein standard platform management techniques are operative to make the power management decisions rather than PML 102. Other embodiments are described and claimed.

The described embodiments may be better understood with reference to the following example. The following example contains references to a particular location for the PML, a particular I/O device and a particular platform component for purposes of illustration and not limitation. It should be understood that any location, I/O device and/or platform component could be used and still fall within the described embodiments.

In one embodiment, the PML 102 may reside in a Linux kernel space and the I/O device 118-1-*n* may comprise a wireless Network Interface Card (NIC). A CPU or other processor may comprise the platform component in one embodiment. In some embodiments, the wireless NIC may carry its idle duration information through a NIC driver to the Linux kernel. Based on this idle duration information and based on system timer information, an idle governor may make a decision regarding the CPU flushing a cache memory and may go into a deepest available C state when the processing is finished.

In various embodiments, the PML may keep track of three values: a) a next packet arrival time from the wireless NIC; b) a next system timer event; and c) a predicted idle duration by interrupts sources other than wireless NIC and system timer. In some embodiments, PML may also keep an exponential weighted moving estimate of interrupts rate, and when this weighted estimate is too high, meaning the system is very busy, PML may stop queries to communication devices and the system may behave as a default system to avoid overhead.

The foregoing examples may be better understood with reference to the following logic flow.

Figure 3:
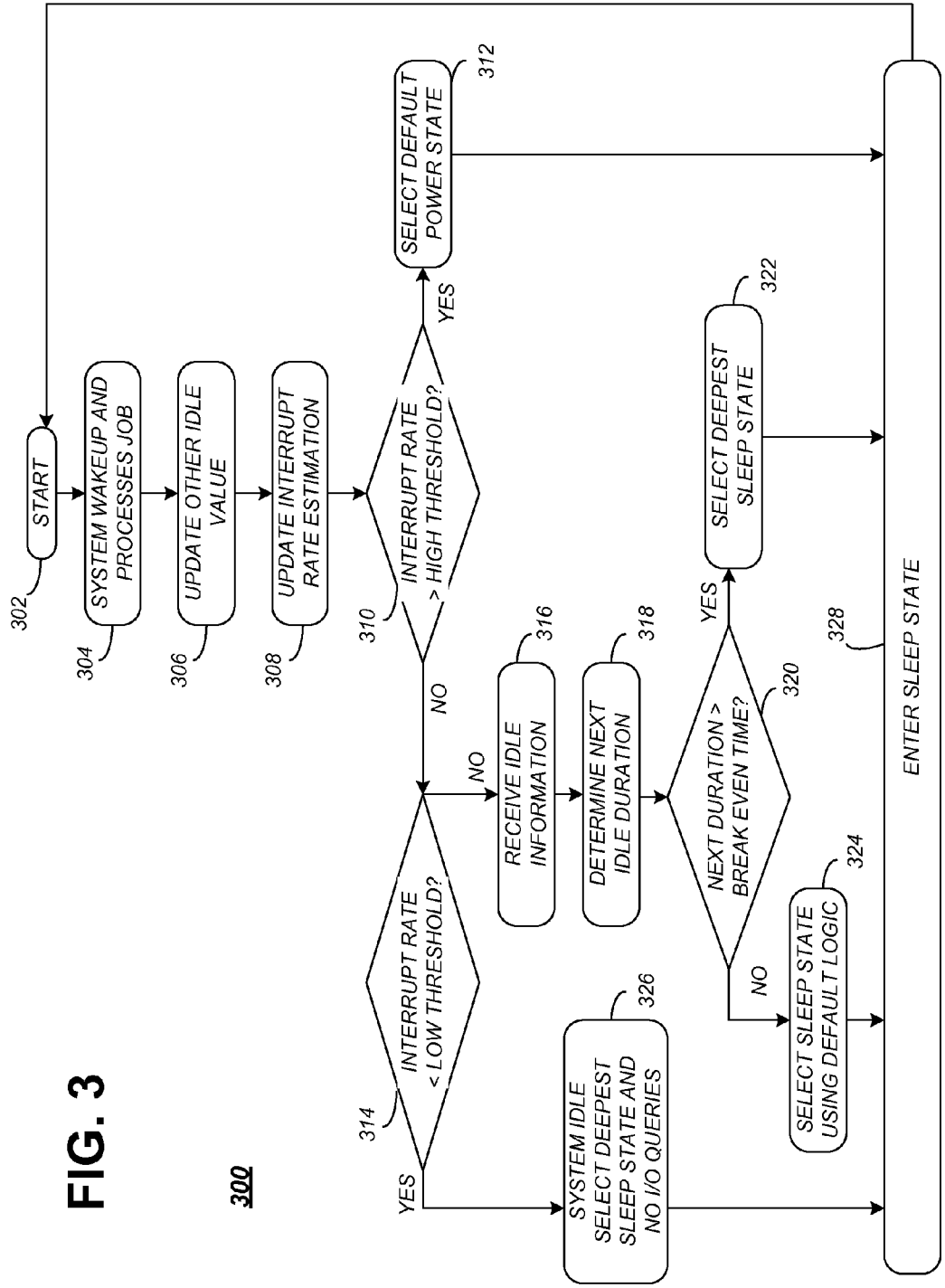
FIG. 3 illustrates one embodiment of a second logic diagram.

FIG. 3 illustrates one embodiment of a second logic flow 300. As described above with reference to logic flow 200, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor). Logic flow 300 may describe I/O device assisted platform power management as described above with reference to apparatus 100 and PML 102, for example.

In various embodiments, power management operations, such as initialization of the PML 102 or other power management operations, may start at 302. At 304, the system may wakeup and processes any available jobs, instructions or other pending tasks. At 306, in some embodiments, the system may update any idle values for interrupts other than I/O device interrupts or system timer interrupts that caused the system to wakeup. The system may update a interrupt rate estimation at 308 in some embodiments. Other embodiments are described and claimed.

At 310, the system may determine if the calculated interrupt rate exceeds a predetermined high threshold. If so, at 312 a default power state is selected and at 328 the default sleep state/power state is entered or enabled at 328. If not, a determination is made at 314 whether or not the interrupt rate is less than a low threshold value. If so, the system may be determined to be idle and the deepest available sleep state may be selected and no I/O queries will be allowed at 326. The deepest sleep stated would then be entered at 328. In various embodiments, the sleep state selected at 326 may comprise a default power state. In some embodiments, the default sleep state may comprise a lowest available sleep state. If the interrupt rate is not less than the low threshold at 314, idle information is received from one or more I/O devices at 316. At 318 a next idle duration is determined. 10. In some embodiments, the power management logic may be operative to estimate the interrupt rate for one or more I/O devices and to select a default power state if the estimated interrupt rate exceeds a threshold or determine a next idle duration if the interrupt rate does not exceed a threshold. Other embodiments are described and claimed.

In various embodiments, a determination is made at 320 whether or not the determined next idle duration is greater than a predetermined break even time for the system. For example, it may be determined whether or not the next idle duration will be of sufficient length to allow the system to at least break even on power savings. If not, at 324 a sleep state for the system or one or more platform components of the system may be selected using default logic and the default logic sleep state may be entered at 328.

If the next idle duration is greater than the break even time at 320, a deepest available sleep state may be selected at 322 and may be entered at 328. The process may continue after a sleep state is entered at 328 and may resume from the start 302 to continue to monitor for power saving opportunities. It should be understood that the above described logic flow 300 and some or all of the described steps of the logic flow 300 may be implemented by a system, such as apparatus 100 and PML 102 of FIG. 1 in various embodiments. Other embodiments are described and claimed.

Figure 4:
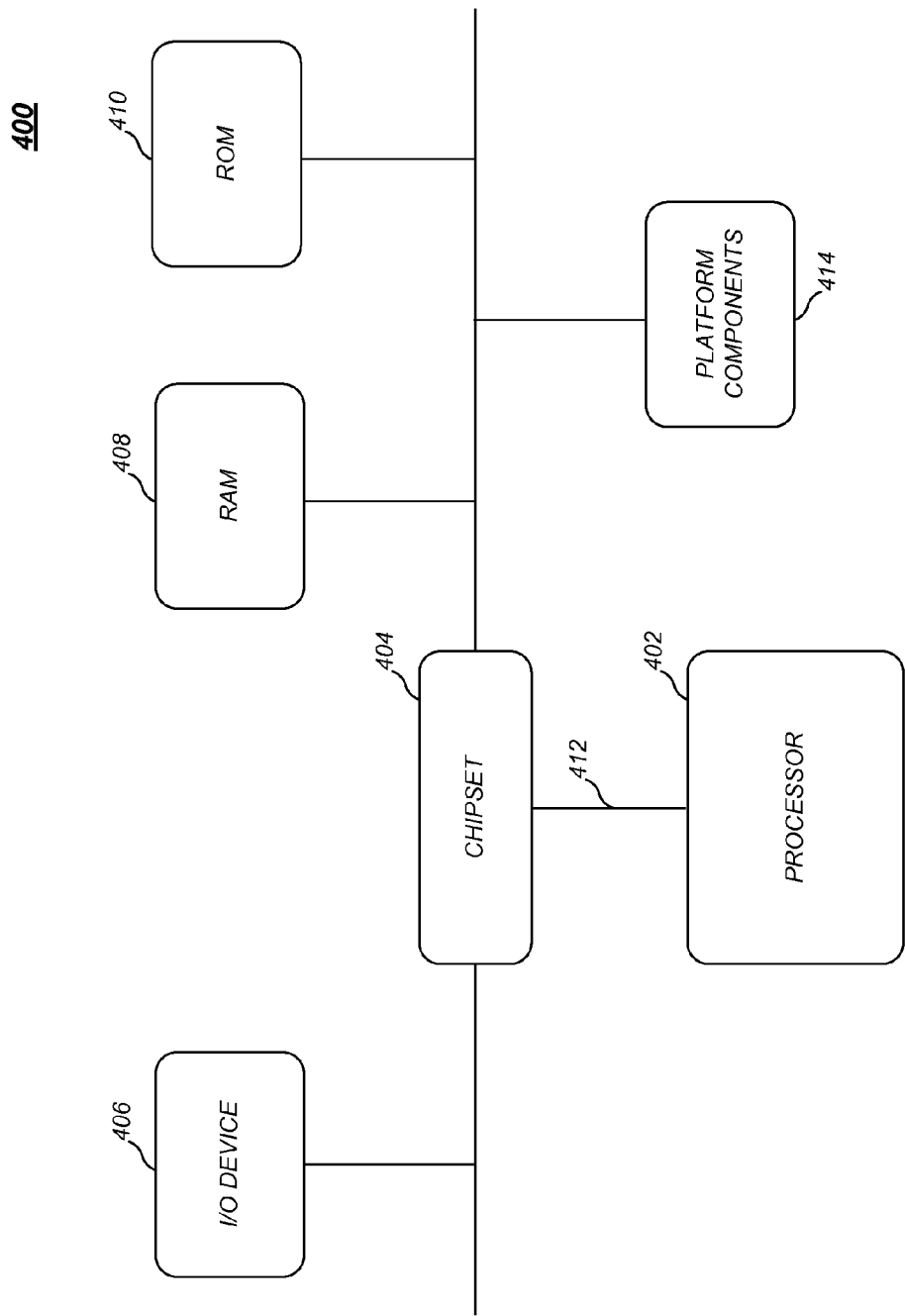
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines. In various embodiments, chipset 404 may be integrated or packaged with processor 402. Other embodiments are described and claimed.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, 802.11 Wireless LAN, 802.16 WiMAX, 3G/LTE, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. An apparatus, comprising:
one or more processors; and power management logic operative on the one or more processors to receive upcoming idle duration information from one or more input/output (I/O) devices, to modify a power state for one or more components based on the idle duration information and an interrupt rate, to track an exponential weighted moving estimate of interrupt rates, and to stop receiving upcoming idle duration information and enter a default power state if the exponential weighted moving estimate exceeds a threshold.

2. The apparatus of claim 1, the power management logic operative to determine a next idle duration based at least in part on one or more of the idle duration information, system timer information, and idle duration history information.

3. The apparatus of claim 1, the idle duration information received from one or more device drivers of the one or more I/O devices.

4. The apparatus of claim 1, the idle duration information received from platform firmware.

5. The apparatus of claim 1, the power management logic operative in a user space, a kernel space or platform firmware.

6. The apparatus of claim 1, the idle duration information comprising an idle duration during which no interrupts are received from one or more I/O devices.

7. The apparatus of claim 1, wherein modifying the power state comprises selecting a reduced power state for one or more platform components.

8. The apparatus of claim 1, wherein modifying the power state comprises selecting a reduced power state for one or more processors or one or more processor cores.

9. The apparatus of claim 1, the power management logic operative to flush a cache memory based on the power state modification and wherein modifying the power state comprises selecting a lowest available power state for one or more platform components.

10. The apparatus of claim 1, the power management logic operative to estimate the interrupt rate for one or more I/O devices and to select a default power state if the estimated interrupt rate exceeds a threshold.

11. The apparatus of claim 1, the power management logic operative to estimate the interrupt rate for one or more I/O devices and to determine a next idle duration if the interrupt rate does not exceed a threshold.

12. A computer-implemented method, comprising:
receiving upcoming idle duration information from one or more input/output (I/O) devices;
modifying a power state for one or more components based on the idle duration information and an interrupt rate;
tracking an exponential weighted moving estimate of interrupt rates; and
stopping the receipt of upcoming idle duration information and entering a default power state if the exponential weighted moving estimate exceeds a threshold;
one or more of the receiving, modifying, tracking or stopping performed by logic operative on one or more processors.

13. The computer-implemented method of claim 12, comprising:
determining a next idle duration based at least in part on one or more of the idle duration information, system timer information, and idle duration history information received from one or more device drivers of the one or more I/O devices.

14. The computer-implemented method of claim 12, comprising:
determining a next idle duration based at least in part on one or more of the idle duration information, system timer information, and idle duration history information received from platform firmware.

15. The computer-implemented method of claim 12, comprising:
selecting a lowest available power state; and
flushing a cache memory.

16. The computer-implemented method of claim 12, comprising:
estimating an interrupt rate for one or more I/O devices; and
selecting a default power state if the estimated interrupt rate exceeds a threshold; or
determining a next idle duration if the interrupt rate does not exceed a threshold.

17. The computer-implemented method of claim 12, wherein modifying the power state comprises selecting a reduced power state for one or more platform components of a mobile computing device and the I/O devices comprise one or more network devices, universal serial bus (USB) devices, audio devices, video devices, disk drive devices, and peripheral devices of the mobile computing device.

18. An article comprising a non-transitory machine-readable storage medium containing instructions that if executed by a processor enable a system to:
receive upcoming idle duration information from one or more input/output (I/O) devices;
modify a power state for one or more components based on the idle duration information and an interrupt rate;
track an exponential weighted moving estimate of interrupt rates; and
stop the receipt of upcoming idle duration information and enter a default power state if the exponential weighted moving estimate exceeds a threshold.

19. The article of claim 18, further comprising instructions that if executed enable the system to:
determine a next idle duration based at least in part on one or more of the idle duration information, system timer information, and idle duration history information received from the one or more I/O devices or from platform firmware.

20. The article of claim 18, further comprising instructions that if executed enable the system to:
select a lowest available power state;
flush a cache memory,
estimate an interrupt rate for one or more I/O devices; and
select a default power state if the estimated interrupt rate exceeds a threshold; or
determine a next idle duration if the interrupt rate does not exceed a threshold.

* * * * *